(12) United States Patent
Patsy, Jr.

(10) Patent No.: US 9,340,238 B2
(45) Date of Patent: May 17, 2016

(54) EXTRUSION

(71) Applicant: Glorio J. Patsy, Jr., Cumming, GA (US)

(72) Inventor: Glorio J. Patsy, Jr., Cumming, GA (US)

(*) Notice: Subject to any disclaimer, the term of this patent is extended or adjusted under 35 U.S.C. 154(b) by 0 days.

(21) Appl. No.: 13/828,872

(22) Filed: Mar. 14, 2013

(65) Prior Publication Data

US 2014/0272210 A1 Sep. 18, 2014

(51) Int. Cl.
*E04C 3/00* (2006.01)
*B62D 29/00* (2006.01)
*E04C 3/04* (2006.01)
*F16B 5/06* (2006.01)
*E04F 10/06* (2006.01)
*E04H 15/64* (2006.01)
*E04H 15/58* (2006.01)
*F16B 7/04* (2006.01)
*B21C 23/08* (2006.01)
*B21C 23/14* (2006.01)

(52) U.S. Cl.
CPC ............ *B62D 29/008* (2013.01); *B21C 23/085* (2013.01); *B21C 23/142* (2013.01); *E04C 2003/0439* (2013.01); *E04C 2003/0452* (2013.01); *E04C 2003/0456* (2013.01); *E04F 10/0633* (2013.01); *E04H 15/58* (2013.01); *E04H 15/646* (2013.01); *F16B 5/0692* (2013.01); *F16B 7/04* (2013.01); *Y10T 428/13* (2015.01)

(58) Field of Classification Search
CPC ... E04H 15/58; E04H 15/646; E04F 10/0633; F16B 5/0692; E04C 2003/0452; E04C 2003/0456; E04C 2003/0439
USPC ............. 52/831, 840, 843, 850, 851, 86, 222, 52/74; 160/397; 428/586
See application file for complete search history.

(56) References Cited

U.S. PATENT DOCUMENTS

| 3,391,816 | A | * | 7/1968 | Swett ...................... A47J 47/02 220/534 |
| D218,295 | S | * | 8/1970 | Maclillan et al. ............ D25/122 |
| 4,275,746 | A | * | 6/1981 | Gruber ...................... A24F 3/00 131/178 |
| 5,044,131 | A | * | 9/1991 | Fisher ............................... 52/63 |
| 5,076,033 | A | * | 12/1991 | Patsy, Jr. ......................... 52/222 |
| 5,224,306 | A | * | 7/1993 | Cramer ............................ 52/63 |
| 5,242,004 | A | * | 9/1993 | Stilling ............................ 160/57 |
| 5,535,565 | A | * | 7/1996 | Majnaric .................... E04C 3/28 249/192 |
| 5,545,488 | A | * | 8/1996 | Burke ............................ 428/586 |
| 5,555,695 | A | * | 9/1996 | Patsy, Jr. ......................... 52/843 |
| 5,577,352 | A | * | 11/1996 | Fisher ............................... 52/74 |
| 5,794,400 | A | * | 8/1998 | Fisher et al. .................... 52/844 |
| 5,906,078 | A | * | 5/1999 | Cramer ........................... 52/222 |
| 6,024,241 | A | * | 2/2000 | Keillor ................... A47B 88/20 220/529 |
| 6,499,655 | B1 | * | 12/2002 | Moen ..................... B65D 5/322 229/120.24 |
| 6,668,512 | B2 | * | 12/2003 | Ray .......................... E04B 5/19 52/843 |
| 7,699,091 | B2 | * | 4/2010 | Fisher et al. .................. 160/397 |

* cited by examiner

Primary Examiner — Chi Q Nguyen
(74) Attorney, Agent, or Firm — Thomas | Horstemeyer, LLP

(57) ABSTRACT

An extrusion is provided that may be used in the construction of a framework assembly and that is lighter, stronger and less expensive than previously available extrusions. In various aspects, the extrusion generally has four sides and is quadrangular in cross-section. A web member may extend the inside of the cross-section of the extrusion between two of the sides. The web member thus may bisect the interior of extrusion forming a first interior cavity and a second interior cavity. The first and second cavities may be equally dimensioned in cross-section. The extrusion may be a metal extrusion formed from aluminum and/or steel.

16 Claims, 3 Drawing Sheets

EXTRUSION

TECHNICAL FIELD

The present disclosure relates generally to extruded shapes which may be used as a structural component and more specifically, to an improved metal extrusion.

BACKGROUND

Extruded metal components, for example aluminum extrusions are typically used to construct a frame or a framework. Over the years, framework assemblies have developed from wooden constructions to more advanced designs employing aluminum (or other light metal) extrusions. As commodity prices have increased the cost of manufacture and the pricing of metal extrusions has increased significantly. There is a need for a lighter and stronger metal extrusion that can be used as a structural component in a framework assembly that is also less expensive.

SUMMARY

By the present disclosure an extrusion that may be used in the construction of a framework assembly is provided that is lighter and stronger than previously available extrusions. The present extrusion is also less expensive, using less material to form the extrusion. In various aspects, the extrusion may be a metal extrusion formed from aluminum and/or steel.

Other systems, methods, features, and advantages of the present disclosure for a micro-structural component, in particular a metal extrusion member to be used as a structural component, will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Described below are various embodiments of the present systems and methods for a structural component. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Figure 1:
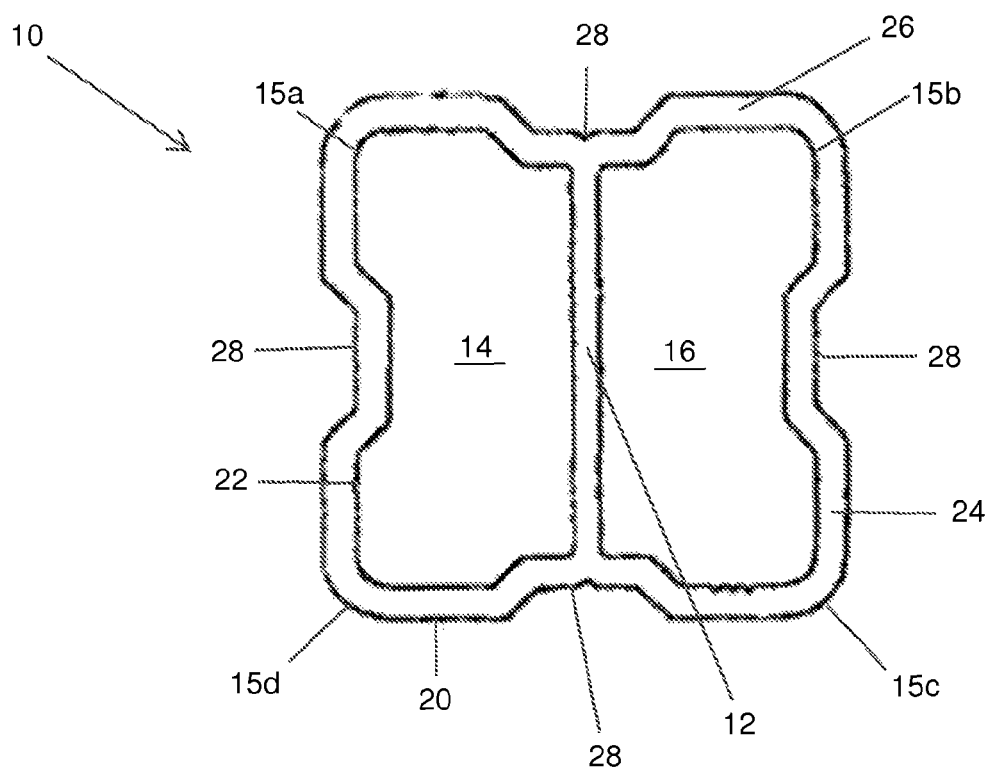
FIG. 1 is a cross-sectional view of a non-limiting embodiment of an extrusion of the present disclosure.
Figure 2:
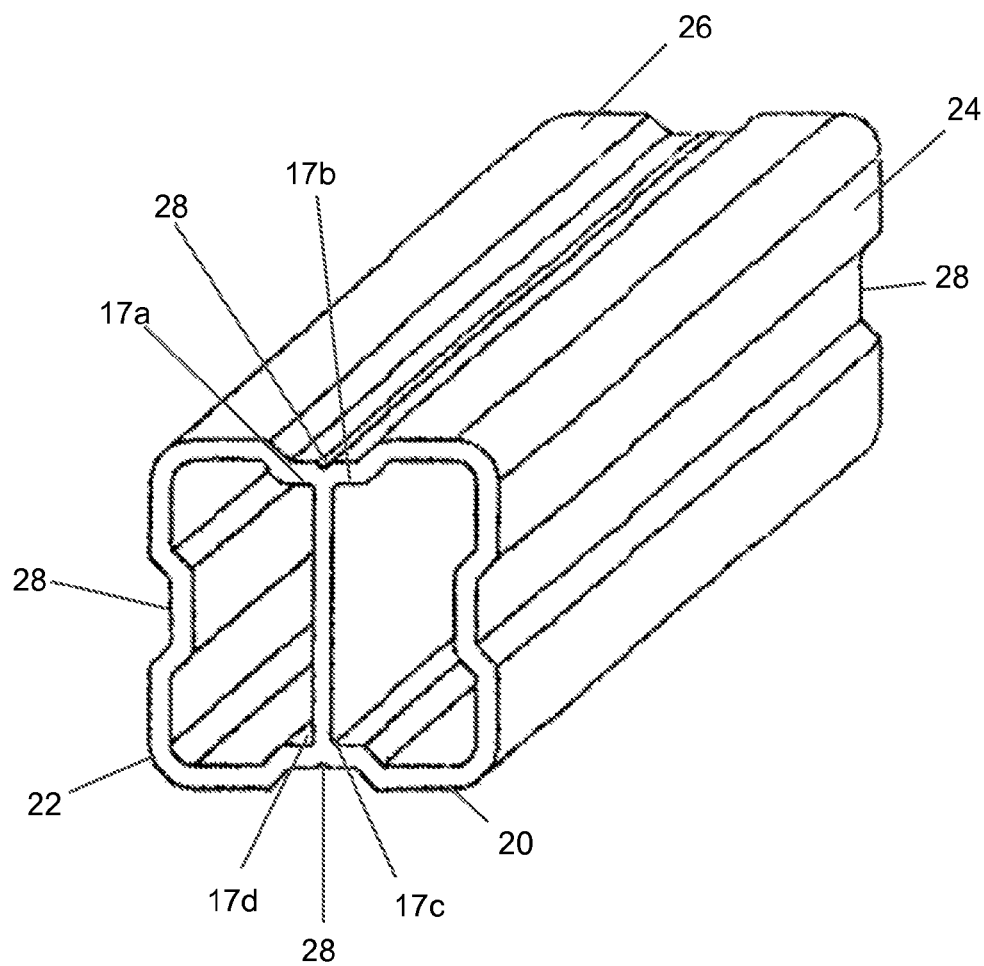
FIG. 2 is a perspective view of the extrusion configuration shown in FIG. 1.

Shown in FIGS. 1 and 2, is a non-limiting example of a cross-section of an extrusion 10 of the present disclosure. The extrusion 10 generally includes a base member 20 having a first end and a second end, a first side member 22 extending upwardly from said first end of said base member 20, and a second side member 24 extending upwardly from said second end of said base member 20. Each side member 22 and 24 has a first end and a second end, each first end extending from the base member 20. In various aspects, the first and the second side members extend generally from the first and the second ends of the base member, respectively.

The extrusion 10 further includes a top member 26 extending from and connecting the second ends of each of the side members 22 and 24. The top member, thus, spans the two side members 22 and 24. In any one or more embodiments the first and second side members 22 and 24 may extend perpendicularly from base member 20. Similarly top member 26 may extend perpendicularly from and adjacent to the second ends of the side members 22 and 24. The top member 26 may be parallel to the base member 20. Likewise the side members 22 and 24 may be parallel to each other. In such embodiments the extrusion may be generally quadrangular in cross-section, through it need not be. In various aspects it may be generally square or rectangular in cross-section. In various aspects, extrusion 10 is generally a four-sided structural component.

As depicted, a web member 12 contactably extends between bottom member 20 and top member 26. Web member 12 may bisect the interior of extrusion 10, thus forming a first interior cavity 14 and a second interior cavity 16. As depicted, web member 12 is centrally located along base and top members 20 and 26, equidistant between side members 22 and 24, such that cavities 14 and 16 have approximately the same space or area. Web member 12, however, need not be equidistantly positioned between side members 22 and 24 and may instead be positioned off center or asymmetrically within extrusion 10 such that cavities 14 and 16 are not equally dimensioned. In the extrusion of FIG. 1, although preferred, it is unnecessary that the reinforcing web member be straight and parallel to side members 22, 24. However, in various embodiments, the web member 12 is straight and parallel to the side members 22 and 24. As also shown in FIG. 1, the interior cavities 14 and 16 are closed.

The extrusion 10 may include other structural and functional elements. The first and second side members 22 and 24, as well as base member 20 and top member 26 may contain indentations 28 which may serve to longitudinally strengthen extrusion 10. As depicted indentations 28 may be beveled indentations. The indentations, however, need not be beveled. Any one or more of the indentations may have a v-shaped, u-shaped, w-shaped or other shaped cross-section. Moreover, the indentations 28 need not each have the same cross-sectional dimensions.

As depicted in FIGS. 1 and 2, extrusion 10 has corresponding sides, base and top members 22, 24, 20 and 26 of which may, but need not, have similarly positioned indentations 28. It will also be recognized, however, that the cavities 14 and 16 of extrusion 10 may be generally quadrangular in cross-section, though they need not be; the interior walls of cavities 14 and 16 do not need to follow the contours of the external surfaces of side members 22 and 24 or top and bottom members 20 and 26 with their reinforcing indentations 28 as depicted. Additional material (not shown) may be provided in portions of the members that form either or both cavity 14 or 16 of extrusion 10 to offer some additional structural advantages in some applications by functioning as longitudinal bracing.

While the above embodiments disclose specific extrusions with walls that will remain in substantially parallel relationship with each other during bending, numerous other operable variations can be made by modifying, multiplying, adjusting, enhancing and/or otherwise combining the specific elements that provide the structural integrity of each of the disclosed extrusions.

Web member 12 provides various advantages. For example, it may allow a lighter, yet stronger metal extrusion for use in construction of a framework assembly. While the use of a single straight web member 12 may be sufficient for certain, for example bending applications, other situations may require greater bending tolerance, and thus, other additional means of reinforcement. In these embodiments, greater strength may typically be achieved if these additional reinforcement means are closely associated with the web member 12. However, it is not always required.

Another means in addition to web member 12 to maintain the structural integrity of the walls defining extrusion 10 in substantially parallel relationship with each other during bending may involve the use of the indentations 28 (which may be external or internal) in any one or more of the extrusion's side, top and base members. Such indentations may reduce or change the pertinent tensions and shearing forces urging the sidewalls to inwardly collapse upon bending and thus impede the narrowing of the respective channels. A non-limiting example of the use of indentations is seen in the extrusion cross-section illustrated in FIG. 1. Extrusion 10 of FIG. 1 shows the use of indentations 28 in the bottom and top members 20 and 26 in a location where the web member 12 makes contact with the bottom and top members. It is believed that such a configuration allows the indentations to reinforceably brace the web member 12. Furthermore, the indentations may appear in other areas in one or more of the side top or bottom members, as well as in the side members 22 and 24.

Figure 3:
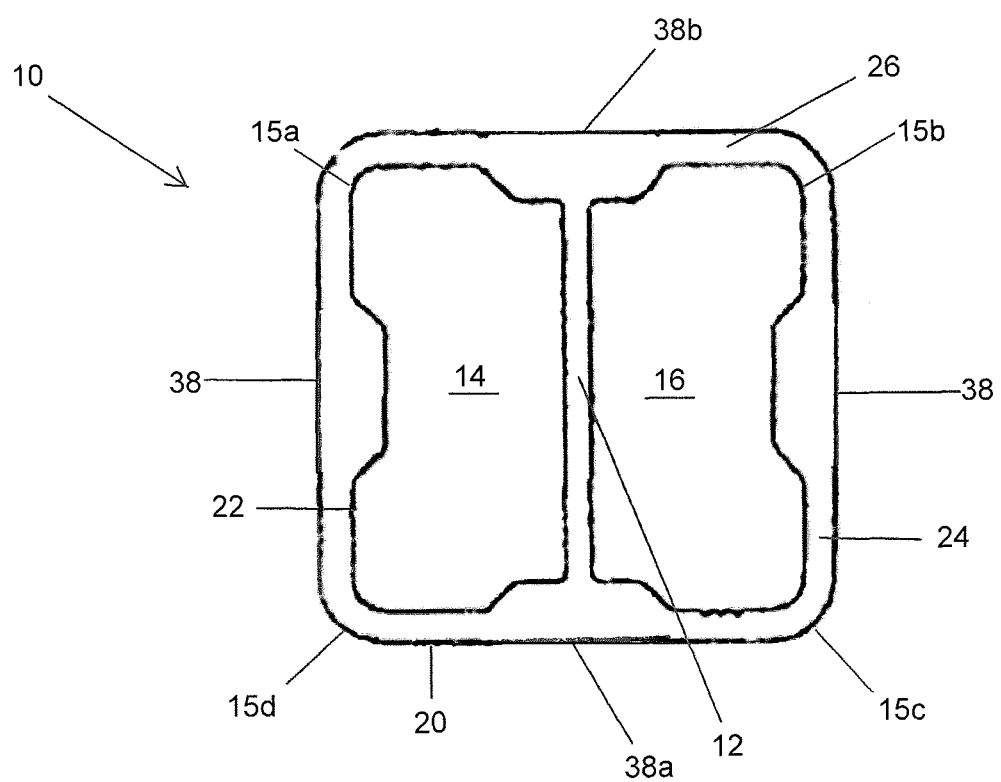
FIG. 3 is a cross-sectional view of another non-limiting embodiment of an extrusion of the present disclosure.

Depicted in FIG. 3 is another additional means to maintain the structural integrity of the walls defining the channel in substantially parallel relationship during bending may involve the use of distension zones 38. Structurally, distension zones are reinforced areas that may serve to spread stress. Distension zones are areas where the thickness of a wall section of any one or more of the side, top or bottom members is thicker than the rest of the wall section extending either inwardly or outwardly further than the rest of the member. For example a first and a second distension zone 38a, 38b may be located respectively on the bottom and top members 20 and 26 at the locations where the web member 12 connects to the members. A cavity (not shown) may be designed into the interior of one or more distension zones. Though preferred, the distension zones need not be adjacently associated with the web member 12.

Still another means to help maintain the walls defining the channel in substantially parallel relationship with each other during bending, is to incorporate internal longitudinal bracing at the junctures of extrusion components. This bracing can be utilized where the side members meet the base, and/or top member and/or between the web 12. A typical location for this means of reinforcement would be inside all four corners 15a, 15b, 15c, 15d of FIG. 1. Another would be above and below the juncture of the inner web 12 with bottom and top members 20, 26 in corners 17a, 17b, 17c, 17d. This bracing may be used alone in conjunction with web member 12 or in addition to use of one or more indentations or distension zones or both.

It is envisioned that other means of reinforcing extrusions can be derived from the means disclosed herein in accordance with the present disclosure.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

I claim at least the following:

1. A structural component comprising:
    a continuous peripheral base member defining a first plane and having a first end and a second end;
    a continuous peripheral first side member defining a second plane extending upwardly from said first end of said base member;
    a continuous peripheral second side member defining a third plane extending upwardly from said second end of said base member and parallel to the second plane of the first side member;
    each side member having a first end and a second end, each first end extending from the base member;
    a continuous peripheral top member defining a fourth plane, the top member extending from and connecting the second ends of each of the side members and parallel to the first plane of the base member, the base member extending from and connecting the first ends of each of the side members; and
    an inner web member connecting and contactably extending between said base member and said top member, said base member, first side member, second side member, top member and inner web member formed together as a single, unitary element to form said structural component,
    said structural component consisting of a first interior cavity to one side of said inner web member and a second interior cavity to an opposite side of said inner web member, said structural component defining a substantially quadrangular cross-section having a width, said inner web member spanning the width of said structural component and defining a fifth plane parallel to said first side and second side members.

2. The structural component according to claim 1, wherein said base member includes a first indentation, and said top member includes a second indentation.

3. The structural component according to claim 1, wherein one of said side members includes a first indentation.

4. The structural component according to claim 1, wherein said first side member includes a third indentation, and said second side member includes a fourth indentation.

5. The structural component according to claim 1, wherein said inner web member includes a central portion defining the fifth plane perpendicular to said base member.

6. The structural component according to claim 1, wherein said inner web member defines the fifth plane perpendicular to said base member.

7. A structural component for use in the construction of framed, flexible cover structures comprising:
    a continuous peripheral first side member having a first end and a second end;
    a continuous peripheral second side member extending upwardly from said first end of said first side member and including a first indentation;

a continuous peripheral third side member extending upwardly from said second end of said first side member and including a second indentation;

each of the second and third side members having a first end and a second end, each first end extending from the first side member;

a continuous peripheral fourth side member extending perpendicularly from the second end of said second side member and extending perpendicularly from the second end of said third side member, said fourth side member connecting the second ends of the second and third side members; and an inner web member connecting and contactably extending between said first indentation of said second side member and said second indentation of said third side member, said structural component defining a first interior cavity to one side of said inner web member and a second interior cavity to an opposite side of said inner web member, said structural component defining a substantially quadrangular cross-section having a width, said inner web member spanning the width of said structural component.

8. The structural member according to claim 7, said fourth side member being parallel to said first side member.

9. The structural component according to claim 7, wherein said first side member includes a first side member indentation and said fourth side member includes a fourth side member indentation.

10. The structural component according to claim 7, wherein said inner web member includes a central portion defining a plane parallel to said first side member.

11. The structural component according to claim 7, wherein said inner web member defines a plane parallel to said first side member.

12. The structure of claim 7, wherein one of said side first or fourth side members includes a third indentation.

13. The structure of claim 12, wherein the other of said first or fourth side members includes a fourth indentation.

14. A structural component comprising:
   a first side member having a first end and a second end;
   a second side member extending upwardly from said first end of said first side member and;
   a third side member extending upwardly from said second end of said first side member;
   each of the second and third side members having a first end and a second end, each first end extending from the first side member;
   a fourth side member extending perpendicularly from the second end of said second side member and extending perpendicularly from the second end of said third side member, said fourth side member connecting the second ends of the second and third side members;
   said second side member having a first upper zone and a first lower zone;
   said third side member having a second upper zone and a second lower zone;
   said second side member having first reinforcement means for preventing the inward collapse of said second side member, said first reinforcement means comprising a first distension zone, said first distension zone being thicker than said first upper zone and said first lower zone;
   said third side member having second reinforcement means for preventing the inward collapse of said third side member, said second reinforcement means comprising a second distension zone, said second distension zone being thicker than said second upper zone and said second lower zone, said structural component defining a substantially square cross-section; and
   an inner web member connecting and contactably extending between said first distention zone of said second side member and said second distention zone of said third side member, said structural component defining a first interior cavity to one side of said inner web member and a second interior cavity to an opposite side of said inner web member, said structural component defining a substantially quadrangular cross-section having a width, said inner web member spanning the width of said structural component.

15. The structural component according to claim 14, further comprising:
   a third reinforcement means comprising a distension zone in one of the side members.

16. The structural component according to claim 15, further comprising:
   a fourth reinforcement means comprising a fourth distension zone in the fourth said side member.

* * * * *